Patented June 17, 1941

2,245,639

UNITED STATES PATENT OFFICE 2,245,639

POUR DEPRESSOR

Jeffrey Hobart Bartlett, Cranford, N. J., and Arthur J. Zadde, New York, N. Y., assignors to Standard Oil Development Company, a corporation of Delaware No Drawing. Application August 15, 1936, Serial No. 96,316

5 Claims. (Cl. 260—671)

The present invention relates to wax modifying agents and to a method for making the same.

Pour inhibiting compounds have heretofore been prepared almost exclusively from waxy hydrocarbons, that is to say, from waxy hydrocarbons which have been chlorinated or dehydrogenated, and are then condensed with aromatic hydrocarbons. These waxy hydrocarbons contain long hydrocarbon chains of 10 carbon atoms or more. It has recently been found that similar wax modifying agents can be produced by substituting relatively low molecular weight ethers for the waxy hydrocarbons. In other words, these ethers are condensed and polymerized with aromatic compounds to produce wax modifying agents.

As stated above, it has been found that aliphatic ethers can be condensed with aromatic compounds to produce pour inhibiting agents for lubricating oils. It has been found that the said ethers may contain less than 10 carbon atoms, and in fact, relatively short chain ethers are highly desirable for this purpose. It will be understood that in the case of saturated ethers they must be halogenated before condensation, or, if desired, unsaturated ethers may be used. If chlorinated ethers are used there should be at least two chlorine atoms or two double bonds in the case of unsaturated ethers. Halogenated unsaturated ethers may be used. It is not necessary that these atoms be placed symmetrically, nor indeed that the alkyl groups be similar. As examples, mixed ethers such as dichlor methyl-ethyl ether or dichlor methyl-amyl ether are perfectly satisfactory, as well as dichlor diethyl or dimethyl ethers.

The chlorinated or other halogenated ether is condensed with aromatic compound which is preferably a hydrocarbon such as benzol or naphthalene, but it has also been found that oxygen containing compounds can be used, for example, phenol, cresols, anthrols and the like. Nitro, amino and halogenated aromatics can also be used, although none of these materials are as desirable as their hydrocarbon equivalents.

In making these compounds a considerable variation in the ratio of the two ingredients is permissible. For example, it is possible to use equal quantities of the ether and the aromatic, and also to use up to about twice as much of the former as of the latter. The optimum ratio depends considerably on the actual compound used and on the temperature and other conditions of reaction. But the optimum falls within the ratio given above. It is also desirable to make considerable variations in the conditions, such as temperature, depending on the ether and/or specific aromatic compound used. The condensation may be accomplished at temperatures as low as room temperatures and higher; for example, up to 250° F. to even 300° F. The time of reaction also varies with the ingredients, the catalyst and temperature. Shorter time is used where higher temperatures are employed. It is desirable not to continue the reaction too long, as the materials form insoluble bodies which are useless for the present purpose.

The condensation is effected by means of catalysts of the Friedel-Crafts type, such as aluminum chloride, boron fluoride, zinc chloride, and the other known equivalents. The reaction proceeds more smoothly if relatively large quantities of the catalyst are used, but for reasons of economy it is preferable to use small amounts, say 10 to 15%, based on the ether, and a somewhat higher temperature preferred than when large amounts of catalyst are employed.

Ordinarily a temperature of about 200° F. is employed with the reacting time from one to five hours and with from 5% to 10% of catalyst. During the reaction a suitable diluent may be used in order to effect more uniform reaction conditions. As to diluents, a number of different materials can be used, such as carbon disulfide, naphtha and the like. After the reaction is completed, water or acid or alkali is added to hydrolyze the catalytic sludge, and this is allowed to settle so that the reaction product may be decanted. The diluent and the lower boiling reaction products are then removed by distillation and the product purified by drying, light clay treatment or the like.

As a specific example of the production and properties of the improved wax modifying agent, the following may be considered:

150 grams of beta-beta'-dichlor diethyl ether is mixed with 100 grams of benzol. The mixture is taken up with 300 cc. of naphtha and 160 grams of aluminum chloride is added to effect condensation. The naphtha used was a petroleum hydrocarbon distillate having a boiling range of about 290° F. to 430° F., consisting essentially of paraffins and naphthenes but also containing a small amount of alkylated aromatics mostly consisting of hydrocarbons having 9 carbon atoms. The temperature is raised rapidly to about 225° F., at which it is maintained for about one hour, then the materials are allowed to cool to room temperature and to stand for a considerable time. After the aluminous sludge has settled, the liquid is hydrolyzed by addition of alcohol and acid, and distilled to remove the solvent naphtha. A yield of about 30% on the ether and benzol is obtained, and analysis showed the product to contain 91.6% carbon and 8.4% hydrogen. 2% of this material is added to a Pennsylvania 150 neutral oil which has a normal pour point of 30° F. The pour point is reduced to —10° F.

The materials disclosed herein are also satisfactory dewaxing aids in dewaxing operations, for example, the addition of a small amount of the material to the waxy oil causes it to settle more rapidly, increases the filter rate and increases the ease of centrifugation. The yield of wax is greater and the pour point of the recovered oil is lower.

The present invention is not limited to any theory of the reaction, nor to any particular method of carrying it out, but only to the following claims in which it is desired to claim all novelty inherent to the invention.

We claim:

1. A product having a boiling point sufficiently high to be left as a residue when the naphtha is distilled off from a naphtha solution thereof, said product being obtained by a Friedel-Crafts condensation of a chlorinated ether having less than 10 carbon atoms, and having a monochlor alkyl group on each side of an oxygen atom serving as the ether linkage, with an aromatic hydrocarbon, at a temperature of about 200° F. to 300° F., said product having the property of depressing the pour point of waxy mineral oils when added thereto in small amounts.

2. A product having a boiling point sufficiently high to be left as a residue when the naphtha is distilled off from a naphtha solution thereof, said product being obtained by a Friedel-Crafts condensation of beta-beta-dichlorethyl ether with benzol, at a temperature of about 200° F. to 300° F., said product having a pour depressor efficiency at least as great as a 40° F. pour point reduction when 2% of the product is added to a Pennsylvania neutral oil having a viscosity of 150 seconds Saybolt at 100° F. and having a normal pour point of 30° F.

3. The process of preparing wax modifying agents which comprises treating a mixture of a symmetrical dihalogen-substituted aliphatic ether containing less than 10 carbon atoms, and an aromatic compound, with a Friedel-Crafts condensation catalyst at a temperature of about 200° F. to 300° F., heating the mixture sufficiently to produce a condensation product having the property of depressing the pour point of waxy mineral oils when added thereto in small amounts, but discontinuing the reaction before the product becomes insoluble in mineral oils, treating the reaction mixture with a hydrolyzing agent, removing the resultant catalytic sludge and subjecting the remaining reaction products to distillation at a temperature at least as high as the distillation temperature of naphtha, to remove lower-boiling constituents.

4. The process of preparing wax modifying agents which comprises treating a mixture of beta-beta-dichlorethyl ether, benzol, and naphtha, with aluminum chloride at a temperature of about 200° F. to 300° F., heating the mixture sufficiently to produce a condensation product having the property of depressing the pour point of waxy mineral oils when added thereto in small amounts, but discontinuing the reaction before the product becomes insoluble in mineral oils, treating the reaction mixture with a hydrolyzing agent, removing the resultant catalytic sludge and subjecting the remaining reaction products to distillation at a temperature at least as high as the distillation temperature of naphtha, to remove lower-boiling constituents.

5. Process according to claim 4, in which approximately the following proportions of materials are used:

| | | |
|---|---|---|
| Beta-beta-dichlorethyl ether | grams | 150 |
| Benzol | do | 100 |
| Naphtha | ccs | 300 |
| Aluminum chloride | grams | 160 |

J. HOBART BARTLETT.
ARTHUR J. ZADDE.